United States Patent [19]

Gelphman et al.

[11] Patent Number: 4,943,821
[45] Date of Patent: Jul. 24, 1990

[54] TOPOLOGICAL PANORAMA CAMERA

[75] Inventors: Janet L. Gelphman, 9337 Lenel Pl., Dallas, Tex. 75220; Kurt R. Mottweiler, Austin, Tex.

[73] Assignee: Janet Louise Gelphman, Dallas, Tex.

[21] Appl. No.: 300,780

[22] Filed: Jan. 23, 1989

[51] Int. Cl.⁵ .......................................... G03B 37/00
[52] U.S. Cl. .................................................. 354/99
[58] Field of Search ..................... 354/94, 95, 96, 97, 354/98, 99, 81, 82, 293, 112; 352/69, 243

[56] References Cited

U.S. PATENT DOCUMENTS

| | | | |
|---|---|---|---|
| 369,165 | 8/1887 | Connon | 354/99 |
| 2,590,389 | 3/1952 | Doyle | 354/81 |
| 3,183,810 | 5/1965 | Campbell et al. | 354/94 |
| 3,437,753 | 4/1969 | Stith | 354/94 X |
| 3,559,552 | 2/1971 | Weitzer | 352/243 X |
| 3,620,148 | 11/1971 | LaRocco et al. | 354/94 |
| 3,688,676 | 9/1972 | Cruickshank | 354/81 |
| 3,820,134 | 6/1974 | Wilton et al. | 354/81 |
| 3,891,301 | 6/1975 | Heller | 354/81 |
| 4,147,419 | 4/1979 | Boyan | 354/94 |
| 4,241,985 | 12/1980 | Globus et al. | 354/99 |
| 4,348,097 | 9/1982 | Sippel | 354/293 |
| 4,515,455 | 5/1985 | Northmore | 354/81 X |
| 4,577,827 | 3/1986 | Eliscu | 354/81 |
| 4,752,791 | 6/1988 | Allred | 354/81 |

OTHER PUBLICATIONS pp. 73-77, Remote Sensing and Image Interpretation, by Lillesand (1981).
pp. 110-113, Surveillant Science-Remote Sensing of the Environment, by Holz.

*Primary Examiner*—Brian W. Brown
*Attorney, Agent, or Firm*—Baker, Mills & Glast

[57] ABSTRACT

A camera (10) comprises a track (14) and a camera unit (12) which is operable to move along the track (14). The camera unit (12) comprises a slit aperture camera for producing a panoramic image. A motor (28) on the camera unit (12) provides power to wheels (20) which are matingly engaged with the upper and lower rails (16, 18) of the track (14). The upper and lower rails (16, 18) are operable to supply electricity to the motor (28). The speed of the camera unit (12) along the track (14) and the speed of the film within the camera unit (12) may be selected by the user.

32 Claims, 8 Drawing Sheets

As you can see, s(x,y) = (2x,y) is the transformation in only one dimension, along the x-axis. Thus every point of x will be transformed to 2x, making the object seem to stretch to the right.

FIG. 7f

Photo 2a, 2b and 2c illustrate continuous transformation of an object by stretching.

FIG. 7g

Topological Stretching

Notice that in Photo 2b, the Z is twice as long as in Photo 2a. The transformation equation $s(x,y) = (2x,y)$ describes the stretching of the object along the X-axis.

[?] Help    Previous ⟨= =⟩ Next    Menu ⟵

FIG. 7h

Topological Stretching

Now compare Photo 2a and 2c. The Z in Photo 2c has stretched along the X-axis to 3 times the size of the Z in Photo 2a.

The transformation describing this stretching is $s(x,y) = (3x,y)$.

[?] Help    Previous ⟨= =⟩ Next    Menu ⟵

TOPOLOGICAL PANORAMA CAMERA

TECHNICAL FIELD OF THE INVENTION

This invention relates in general to photography, and more particularly to a photographic apparatus for capturing fixed perspective still photographs.

BACKGROUND OF THE INVENTION

The word panorama originates from the Greek words "pan" meaning all and "horama" meaning view or sight. The modern day version has several meanings: (1) an unobstructed and wide view of an extensive area; (2) an extended pictorial representation; (3) a continuously passing or changing scene or unfolding of events and; (4) a comprehensive survey, as of a subject.

The traditional panorama camera rotates the mechanism about the rear nodal point of the lens while the film is moved past an optical slit at a speed corresponding to the rotation (ex. Cirkut camera), or alternatively, the lens and slit may turn together, wiping an image on to a stationary strip of film curved about the common center of rotation (ex. Widelux).

The 360° rotating camera records an image that produces a "curvilinear" perspective along the horizontal axis. Curved surfaces that run parallel to the camera's circular path of motion, appear flat in the photograph and flat surfaces, parallel to the diameter of the circle of rotation, appear convex.

A "peripheral" camera is similar to the panorama camera but differs in that the camera remains stationary and the object of the photograph is rotated, relative to the film's motion. Once again, an optical slit is used to record the image onto the film.

The peripheral camera technique is useful for photographing cylindrical objects because it produces a "rolled out" image of the surface of the object. A periphotograph of a noncylindrical object will produce a discontiguous image similar to world maps printed on flat sheets of paper.

The peripheral and rotating cameras are limited in their photographic exploration of the panorama image by the structural limitation that allows only a rotational movement.

The adult human brain perceives space not in a curvilinear perspective of the 360° panorama camera or in the rolled out effect of the peripheral camera but rather in a linear perspective wherein lines converge as they extend into the horizon. Objects appear large in the foreground and shrink in appearance as their position is moved into the distance.

Contrasting with the distortions created in a linear, curvilinear, and rolled out perspectives, a "fixed" perspective produces an undistorted view where an object remains static in size. When an image is fixed in one direction, the objects located along that axis remain fixed in size no matter where their location is in relation to the camera. For example, in an image with a horizontally fixed perspective, an object measuring one inch horizontally and located at a distance of five feet from the camera, will also measure one inch horizontally even when positioned ten or twenty feet away. The fixed perspective has interesting applications in the fields of education, surveying, restoration, and geography, among others.

Therefore, a need has arisen for a camera capable of recording an image in a fixed perspective.

SUMMARY OF THE INVENTION

The camera of the present invention is operable to move along a desired path. Typically, a camera is mounted on the track such that it may move along the path under the power of a transport mechanism. Preferably, the transport mechanism is attached to the camera.

Unlike prior art cameras, the camera of the present invention is operable to produce a fixed perspective photograph in one dimension. The camera of the present invention has commercial applications in many fields, including commercial printing, building restoration, education and photographic negative enlargement.

In one aspect of the present invention, the track comprises a plurality of modular members which may be connected together to form a desired path. The rails forming the track comprise hollow diamond-shaped members having a connecting piece formed at one end. The connecting piece comprises a V-shaped piece of material which inserts into another modular track member. The track member receiving the connecting member has an internal cylinder which may be secured against the V-shaped member to provide a secure and smooth connection. The rails may be made from aluminum or another lightweight metal to allow electricity to be passed to the transport mechanism via the rails.

In another aspect of the present invention, a controller is provided for programmably controlling the film speed and direction and the camera speed and direction. This aspect of the invention allows complex movements to be performed by the camera.

In another aspect of the present invention, a robotic transport mechanism is provided in which the camera is connected to a robotic device which is programmed to perform the desired camera movements.

BRIEF DESCRIPTION OF THE DRAWINGS

For a more complete understanding of the present invention and its advantages, reference is now made to the following descriptions, taken along with the accompanying drawings, in which.

DETAILED DESCRIPTION OF THE INVENTION

The preferred embodiment of the present invention is best understood by referring to FIGS. 1–7 of the drawings, like numerals being used for like and corresponding parts of the various drawings.

Figures 1A, 3D, 3E:
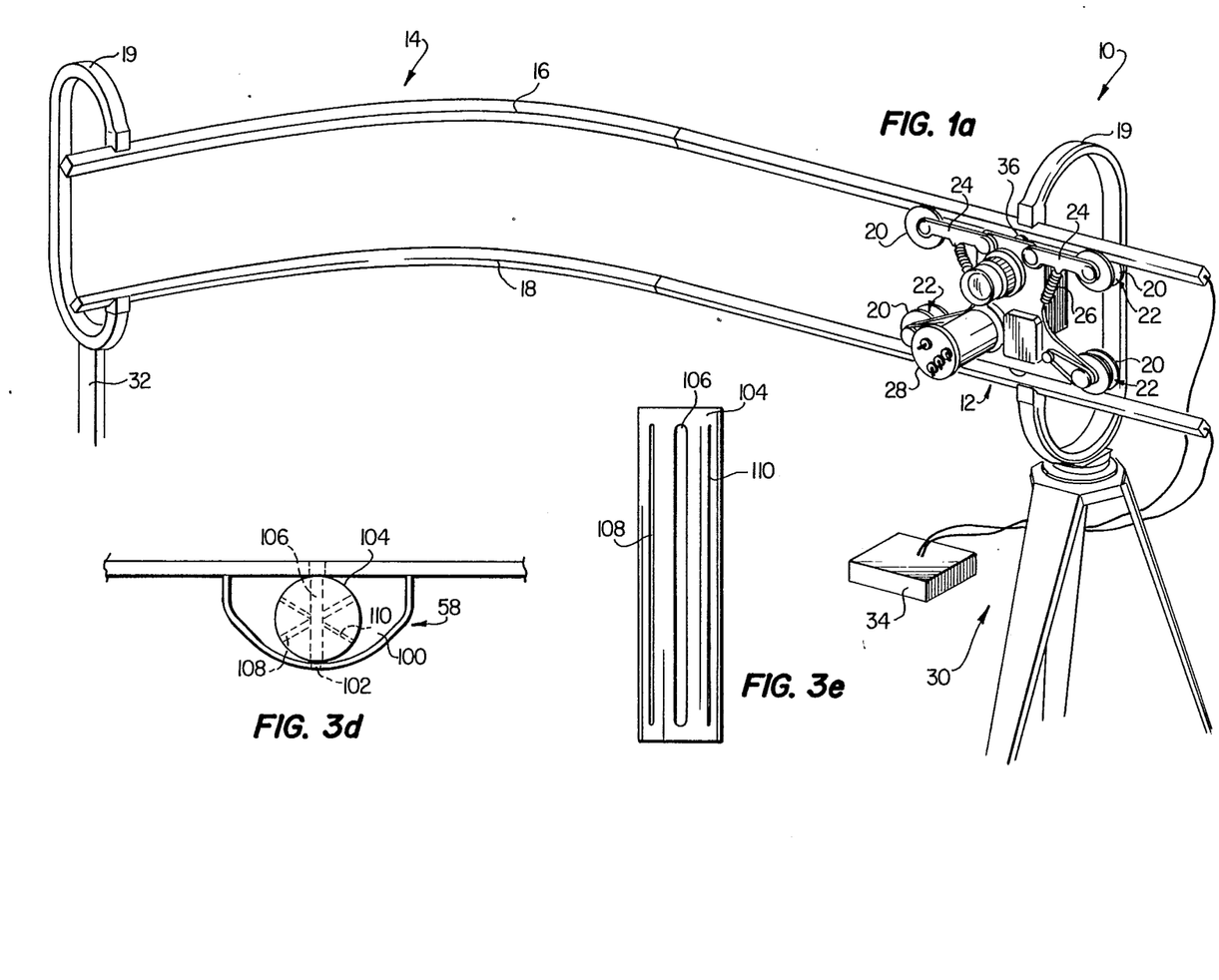
FIG. 1a illustrates a perspective view of the topological camera of the present invention.
FIG. 3d illustrates a top view of the aperture assembly used in the camera of the present invention.
FIG. 3e shows a front plan view of the multi-aperture cylinder used in the camera of the present invention.

FIG. 1a illustrates a perspective view of the topological panorama camera 10 of the present invention. The topological panorama camera 10 comprises a camera unit 12, mounted on a track 14. The track 14 comprises upper and lower rails 16 and 18 held apart at a predetermined distance by C-mounts 19. The camera unit 12 is held between the upper and lower rails 16 and 18 by wheels 20 having a grooved portion 22 with which the upper and lower rails 16 and 18 mate. The upper wheels 20 are connected to the camera unit 12 by swing arms 24. The swing arms 24 are shock-mounted using spring-loaded arms 26. A motor 28 mounted on the camera unit 12 provides power to rotate the wheels 20 along the track 14. The track 14 is held at the desired height by tripods 30 and unipods 32, which attach to the C-mounts 19. A power supply 34 is connected to the upper and lower rails 16 and 18. Power takeoffs 36 attach to the camera unit 12 and make an electrical connection between the rails 16 and 18 and the camera unit 12.

In operation, the camera unit 12 moves along the track 14. The power to move the camera is supplied through the track 14 from power supply 34 and received through power takeoffs 36. Powers takeoffs 36 are connected to various motors on the camera 12. As the camera moves, an image is recorded through a vertical optical slit (See FIGS. 3a–d) onto a roll of film which is moving relative to the optical slit. The speed and direction of the camera unit 12 and the speed and direction of the film relative to the optical slit may be controlled manually or by computer control.

The track 14 is designed in modular segments in order to allow the path of the track 14 to be varied by the user to suit a specific purpose. The modular track pieces include both straight and curved track members.

Figure 1B:
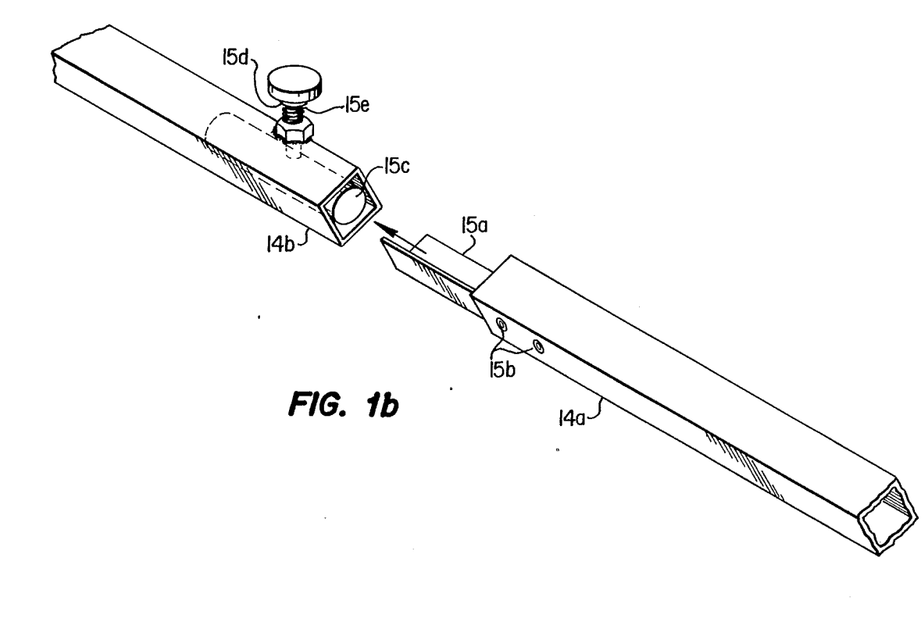
FIG. 1b illustrates a perspective view of the connection between track members.

FIG. 1b illustrates the preferred embodiment for the connection between track members. A V-shaped member 15a is secured to the male end of the track member a by allen screws 15b. A cylindrical member 15c is engaged within the female end of a track member 14b by screw 15d and spring 15e. In operation, the V-shaped member 15a is placed within the female end of the track member 14b. The screw 15d is tightened to force the cylindrical member 15c, typically a solid aluminum tube, against the V-shaped member 15a. The cylindrical portion 15c forces the V-shaped member 15a against the inner walls of the track member 14b, insuring a secure connection with proper alignment between the track members 14a and b. Typically, the track members 14a and b are formed from aluminum, which is both lightweight and will conduct electricity. Alternatively, longer bendable track member could be used.

The wheels 20 may be made of a relatively soft material, such as polyurethane foam to conform to the diamond-shaped track. A combination of grooved wheels 20 and the spring-loaded arms 26 assure that the camera 12 will be centered between the two rails 16 and 18.

In addition to supplying power to the camera, the supply rails 16 and 18 could be used to transmit signals from an external source, such as a personal computer, to the camera. The signals would be able to control features of the camera 12, such as the speed and direction of the camera 12 along the track 14, the speed and direction of the film and the opening and shutting of a shutter between the camera lens and optical slit. Alternatively, control signals could be sent using radio frequency or infrared light modulation.

It may be desirable to change the film and camera speed during an exposure, for example, to compensate for a curved track. This may be accomplished by electronic signalling as described above, or by mechanical means on the track 14 which interact with sensors on the camera 12.

Figure 2:
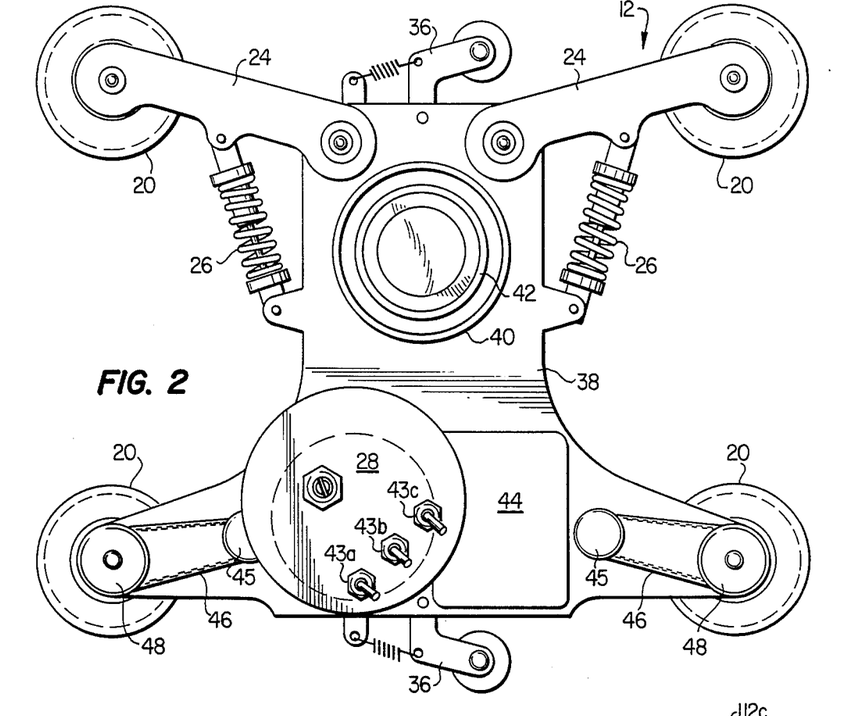
FIG. 2 illustrates a front plan view of the camera body of the present invention.

FIG. 2 illustrates a front view of the camera unit 12. The swing arms 24 are pivotally mounted on a face plate 38. The spring-loaded arms 26 attached between the face plate 38 and to a midpoint on the swing arms 24. The spring-loaded arms 26 exert an upward pressure on the swing arms 24 responsive to a downward force. A lens mount 40 is provided on the face plate 38 for mounting a lens 42 thereon. A logic board 44 is connected to the motor 28 and to a film drive motor (See FIGS. 3a–c). Switches 43a–c provide various manual functions. The switch 43a turns on the motor 28, switch 43b turns on the film drive motor and switch 43c determines the direction of the camera unit 12. Driving pulleys 45 are driven by the motor 28 (See FIG. 3a). Belts 46 connect the driving pulleys 45 with driven pulleys 48 which are connected to the bottom wheels 20 through the face plate 38.

Typically, a DC motor is used for motor 28 to provide the necessary power to drive the camera 12 along the track 14. The logic board 44 may interface the motor 28 to a computer for automated control of the motor's speed and direction. A servo may be included to maintain a constant motor speed, for example, on inclines or around curves. The motor 28 may be electronically linked to the motor used to transport the film (described hereinbelow) to adjust the ratio of the camera speed to film speed such that a single control knob can control both speeds without affecting the desired ratio.

Figure 3A:
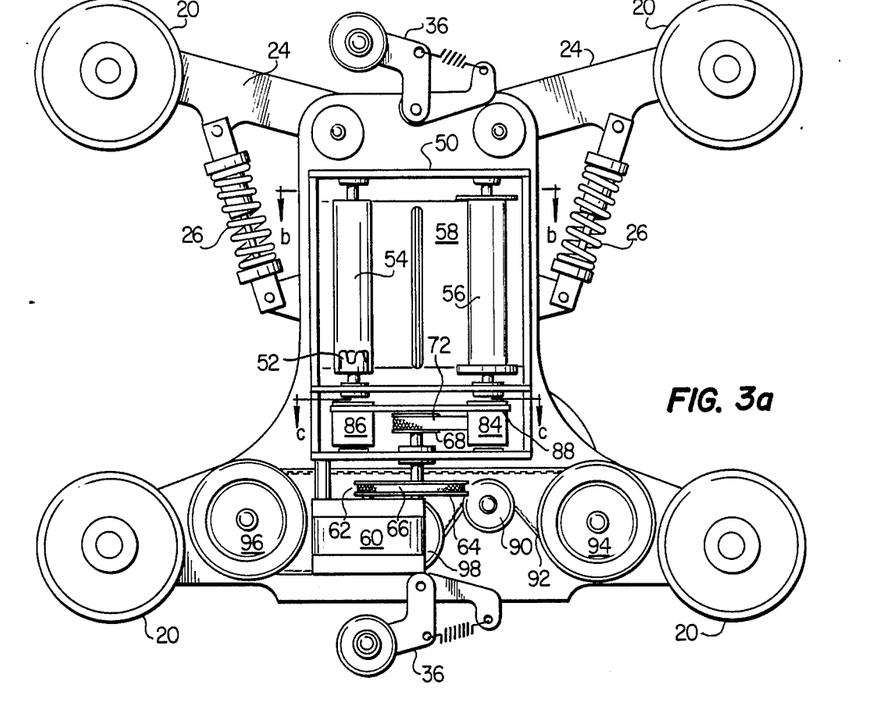
FIG. 3a illustrates a back plan view of the camera body of the present invention.
Figure 3B:
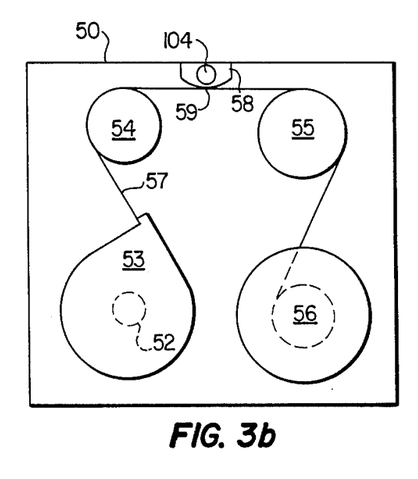
FIG. 3b illustrates a top plan view of the film reel mechanism of the present invention.
Figure 3C:
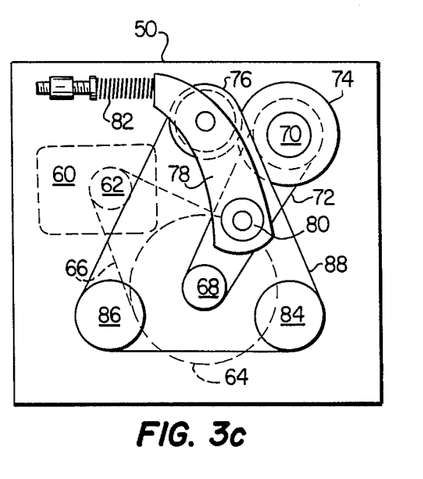
FIG. 3c illustrates a top plan view of the driving mechanism used in the camera of the present invention.

FIG. 3a–c illustrates the back portion of the camera of the present invention. A film enclosure 50 is mounted on the back of the face plate 38. Inside the film enclosure 50, a spindle 52 engages the film cassette 53. An idler roller 54 and a film drive sprocket 55 are at the rear of the film enclosure 50. A take-up reel 56 is mounted at the front of the film enclosure 50. An optical slit assembly 58 is located at the back of the film enclosure 50. The film 57 is threaded around the idler roller 54 and film drive sprocket 55 (which engages the film) onto the take-up reel 56. The optical slit assembly 58 defines a light path between the lens 42 and the film plane 59.

A film drive motor 60 is connected to a pulley 62 which is connected to a first driving pulley 64 by a timing belt 66. The second driving pulley 68, which is on the same shaft as the driven pulley 64, is connected to a final driven pulley 70 by a timing belt 72. The final driven pulley 70 is on the same shaft as a friction drive 74 and the film drive sprocket 55. The friction drive 74 in conjunction with a clutch pulley 76 forms an adjustable slip clutch. The clutch pulley 76 is connected to a pulley arm 78 having a pivot 80 at one end. The other end of the pulley arm 78 is connected to a tensioner 82 which keeps the clutch pulley 76 in constant tension with the friction drive 74. The clutch pulley 76 drives reel pulleys 84 and 86 by way of a round belt 88. The reel pulleys 84 and 86 are connected to the take-up reel 56 and spindle 52, respectively.

A drive pulley 90 is connected to the shaft of the motor 28 shown in FIG. 2. The drive pulley 90 drives a timing belt 92 which engages with driven pulleys 94 and 96. The belt also loops around a tensioning pulley 98. The driven pulleys 94 and 96 are on the same shaft as the driving pulleys 45. Hence, as the drive pulley 90 is rotated by the motor 28, the driven pulleys 94 and 96 rotate accordingly, driving the driving pulleys 45 connected to the wheels 20 through the driven pulleys 48.

The film drive motor 60 drives the film around the path shown in FIG. 3b. While the camera is in operation, the image will be received through the optical slit 58 and recorded on the film 57. In the preferred embodiment, a DC brushless motor having an optical encoder for providing position and velocity feedback is used for the film drive motor 60. This motor can be interfaced with a computer so that a user can manipulate film speed and direction at any given moment, and can preprogram desired film movements. Alternatively, a stepper motor having a high resolution is used. In order to attain the highest speed without stalling, ramping circuitry is provided on the logic board 44. The ramping circuitry slowly increases the speed of the motor from start up.

Referring to FIG. 3c, the operation of the film transport is as follows. The film drive motor 60 rotates the first driving pulley 62 which in turn rotates the driven pulley 64. The second driving pulley 68, connected to the same shaft as the driven pulley 64 drives the final driven pulley 70, which rotates the friction drive 74 and the film drive sprocket 55. The friction drive 74 drives the clutch pulley 76 which turns the reel pulleys 84 and 86, which drive the take-up reel 56 and film cassette 53, respectively. The clutch assembly accommodates the varying ratio between the film drive sprocket 55 and the take-up reel 56 and film cassette 53 as the film either builds or reduces in diameter during exposure.

FIG. 3d illustrates a detailed top view of the optical slit assembly 58. The optical slit assembly 58 comprises an outer housing 100 having a outer slit 102 formed therein. A cylinder 104 is disposed within the outer housing 100. Optical slits 106, 108 and 110 are formed through the aperture cylinder 104. The width of each slits 106–110 is different to provide different light levels for exposing the film. For example, slit 106 may have a width of two millimeters, slit 108 may have a width of one millimeters and slit 110 may have a width of 0.5 millimeters.

FIG. 3e shows a front plan view of the cylinder 104, showing a single slit 106 formed therethrough. The cylinder 104 may be rotated within the outer assembly 100 to provide different exposure settings.

Alternatively, a continuously variable optical slit could be provided which would allow an exposure setting at any width. Such an optical slit could also be interfaced with the computer to provide a change in slit width during an exposure.

Computer control for the camera 10 may be implemented using a controller from Galil Motion Control. The DMC-230 series controller will connect to a personal computer's RS-232 serial communication port and communicate with the computer via simple ASCII commands. Virtually any high level programming language can provide the commands necessary for operation. These commands, known as the instruction set, consist of an upper case ASCII character code followed by an applicable motion control command. Typical commands might be SP 20000 or AC 1000. The former would indicate Speed at 20000 counts per second and the latter would represent Acceleration at 1000 counts per second per second. These commands may be sent directly from the computer at runtime or sent to the controller and stored in nonvolatile (EEPROM) memory for later use independent of the computer. The controller is capable of storing up to 200 lines of 32 character per line code, more than adequate for control sequences for the topological panorama camera 10.

Although the ultimate goal of the topological panoramic camera 10 will be satisfied by the use of prompting for designing and testing the basic camera system, these commands will be sent directly as shown above. The CAI software, which is based on menu screens, will provide the system user with a series of choices based upon familiar constraints. For instance, in the example above, a choice might be, "At what speed (in feet per second) do you want the camera to run? ." The user will respond by indicating an appropriate number. The software will then translate the choice into the command as seen above and send it to the camera controller.

Figures 4A, 4B:
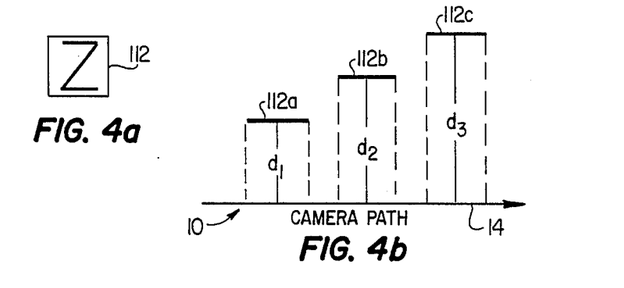
FIGS. 4a–c illustrate images produced by the camera of the present, invention at varying distances.
Figure 4C:
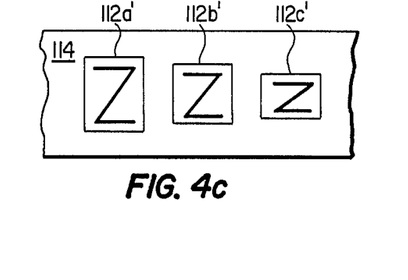

FIGS. 4a–c illustrate one aspect of the topological panorama camera of the present invention. In FIG. 4a, a test subject 112 is shown. The test subject 112 is square with a "Z" formed thereon.

In FIG. 4b, three subjects 112a–c are placed at varying distances from the camera 10. The path of the camera along its track 14 is parallel to the subjects 112. Subject 112a is a distance d1 from the track 14, subject 112b is a distance d2 from the track and subject 112c is a distance d3 from the track 14. The resulting photographic image is shown in FIG. 4c. Resulting images 112a', 112b' and 112c' are shown on the film 114. Assuming a constant camera speed along the track 14 and a constant film speed, the topological panorama camera 10 will not distort horizontally between images. In other words, since each of the subjects 112a–c has the same horizontal width, in the resulting image on the film 114 each of the subjects 112a'–c' will also have the same horizontal width. However, the height of the subjects 112a'–c ' will vary according to the distance between the respective subject and the camera 10.

Because the human mind is use to perceiving horizontal distances shrink with distance (linear perspective), the images appear distorted in the horizontal direction. In an interesting aspect of the camera 10, a "plane of normal perspective", which is dependent upon the film speed and the camera speed, exists at a given distance. Objects in front of this plane will appear horizontally compressed, while objects behind this plane will appear expanded. For example, in FIG. 4c, the subject 112b' is in the plane of normal perspective, and therefore appears normal. Subject 112a' appears compressed horizontally, while subject 112c appears expanded horizontally.

Figure 5:
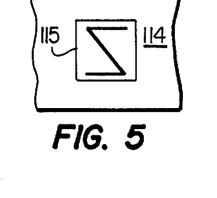
FIG. 5 illustrates an image produced by the camera of the present invention demonstrating reflections.

FIG. 5 illustrates a photograph 114 comprising a mirror image 115 of the subject 112. The mirror image 115 may be produced by moving the film backwards relative to the camera motion, either by moving the camera forward and the film backwards or moving the camera backwards and the film forward. While the image illustrated in FIG. 5 is shown in the plane of normal perspective, it could be compressed or expanded by varying the relative speeds of the camera and film, or by changing the distance between the camera and subject.

Figures 6A, 6B:
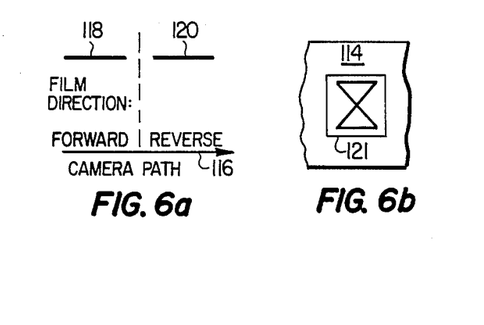
FIGS. 6a–b illustrate an image produced by the camera of the present invention illustrating folding.

FIG. 6a–b illustrate a folded image. As shown in FIG. 6a, the camera path 116 is parallel to subjects 118 and 120. Midway between the subjects, the film direction changes from forward to reverse. Hence, the mirror image of subject 120 is folded over onto the previously recorded image of 118 to produce the folded image 121.

The toplogical panorama camera 10 has many interesting commercial uses. One such commercial use involves the restoration of buildings. Typically during the restoration process, a series of still photographs are taken of the building, such that every feature is detailed. This requires a painstaking process of taking a picture, determining the boundaries of the picture, moving to the next boundary, taking another picture, and so on. With the topological panorama camera 10, the track may be set parallel to one side of the building and a single uninterrupted, undistorted, image of a horizontal strip of the building may be produced. Subsequently, the track may be raised to the next level and another strip taken. This process greatly reduces the manpower needed to undertake the photography of the building, and further, produces a distortion-free image of the building, since the topological panorama camera 10 will not distort horizontal lines as will other cameras.

A similar use of the topological panorama camera is in commercial printing. Currently, the camera ready art, (layouts comprised of text, photographs, drawings, etc.) is photographed by a process camera. The negative of the layout is then used to burn a plate for the printing press. However, the lens of the process camera produces a negative of the original with edge distortion. Since the topological panorama camera receives the image through a vertical slit in the center of the portion of the lens, it produces a horizontally distortion free copy of the original flat copy.

A computerized application of the topological panorama camera for use as a process camera corrects for vertical, as well as horizontal edge distortions. By reducing the size of the optical slit in the vertical direction, light travels only through the center portion of the lens. The reduced slit size makes several scans (vertically, horizontally or combination of both) necessary to photograph the entire flat object. The computerized motion of the topological panorama camera 10 insures exact registration of the film and camera for each scan.

The same approach can be applied to the photographic enlargement process, particularly in the making of photomurals. During the enlargement of a small negative (35 mm, 2¼×2¼ or 4×5) to a photomural (more than ten times its original size), edge distortions from the lens become very noticeable. A topological panorama camera 10 converted to an enlarger, where either the light source, film, or enlarger (camera) move in synchronized speeds, is very useful in the creation of distortion-free photomurals.

Figure 7A:
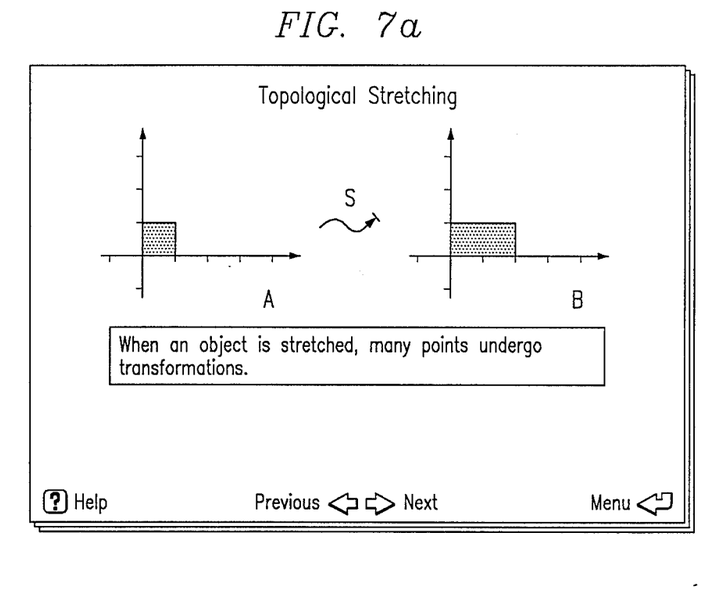
FIG. 7a–h illustrate computer screens used in conjunction with the camera of the present invention to teach mathematics and scientific principles.
Figure 7B:
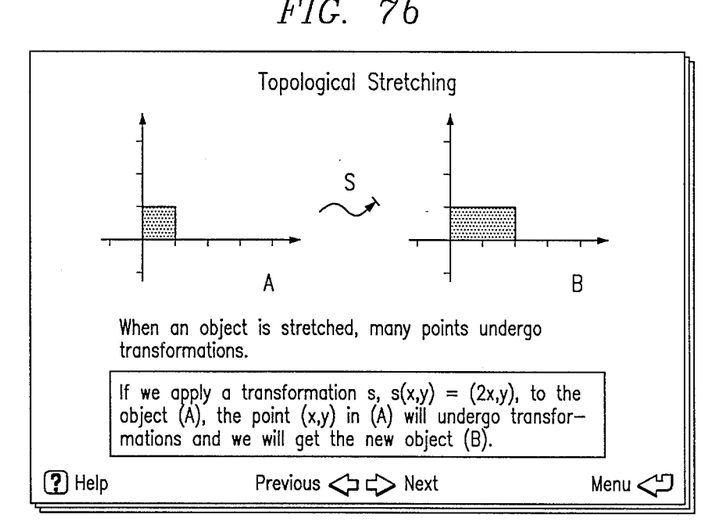
Figure 7C:
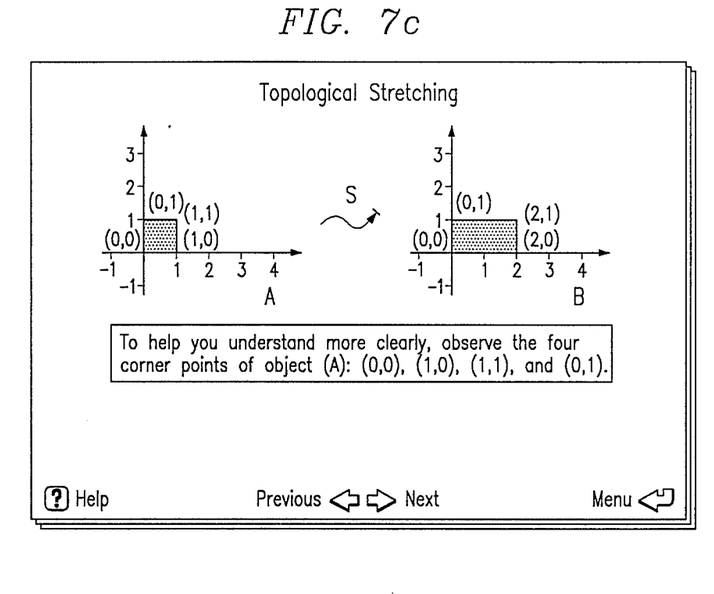
Figure 7D:
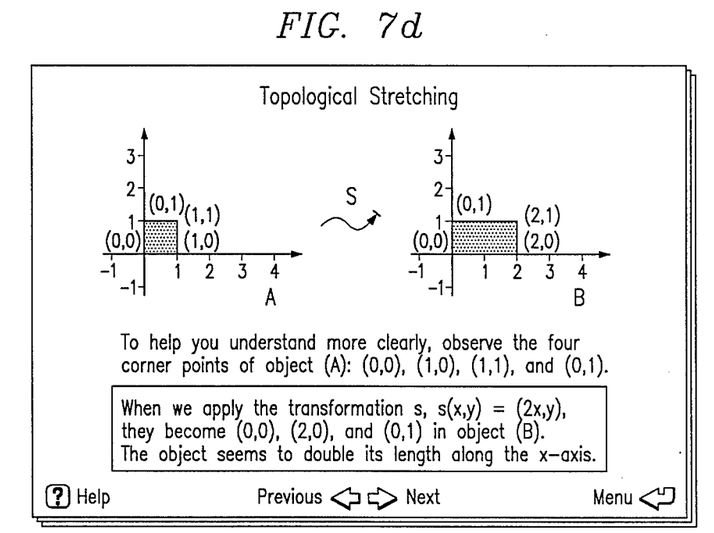
Figure 7E:
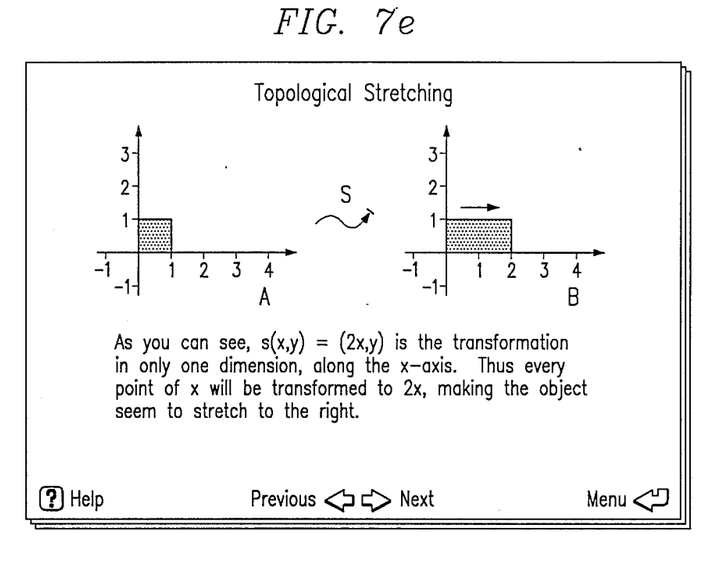

Another interesting field in which the topological panorama camera 10 may have an important impact is that education, particularly in mathematics and science. While a still camera captures a moment in time, the topological panorama camera 10 provides visual depictions of time-space relationships. This allows students to create a visual depiction to enhance their understanding of a mathematical or scientific principle. For example, FIGS. 7a–h demonstrates the use of the camera 10 in conjunction with learning materials showing a stretching transformation. Preferably, the learning materials are embodied in the computer program to allow interactive tutoring of the student. In FIG. 7a, the student is shown a general transformation of a square formed in the upper right quadrant of a first set of coordinate axes to a rectangle in a second set of coordinate axes. In FIG. 7b, the student is given further information on the transformation, defining the transformation $S(X,Y)=(2X,Y)$. In FIGS. 7c–d, the transformation is described in relation to the corner points of the square and rectangle. In FIG. 7e, the transformation of the entire square is described.

Figure 7F:
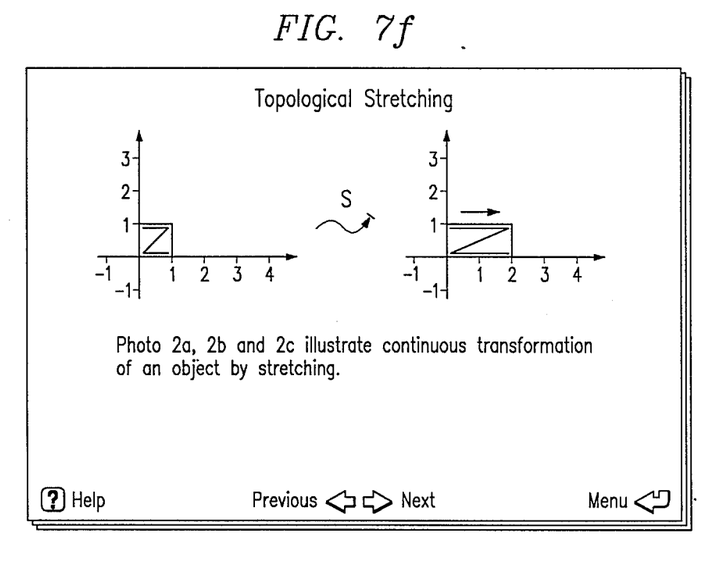
Figure 7G:
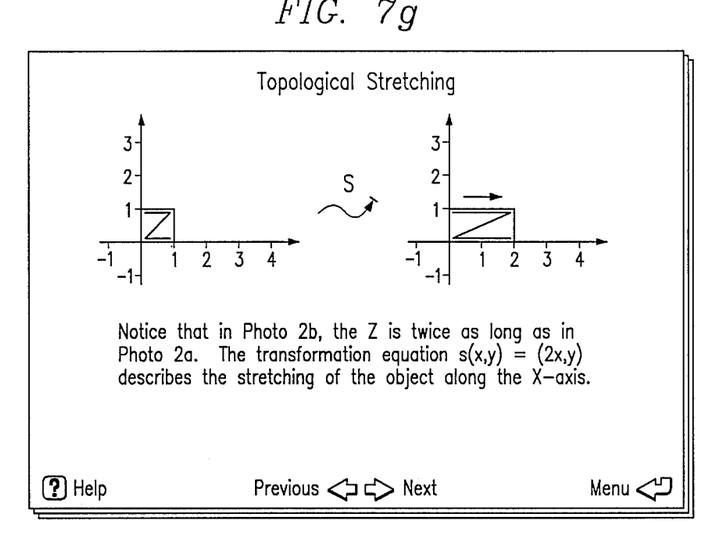
Figure 7H:
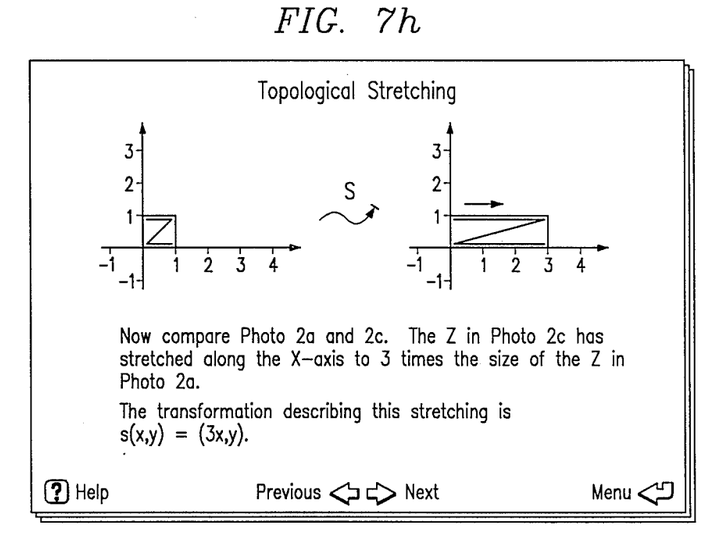

FIGS. 7f–h describe the transformation of an object, such as the subject 112 shown in connection with FIG. 4a. The tutorial in FIGS. 7g and 7h show a two times and a three times stretching of the object, respectively. This stretching can be reproduced by the camera 10 by first taking a photograph of the object in the plane of normal perspective, followed by taking a picture of the object with the film speed relative to the camera speed increased by two and three times.

By preparing the camera 10 to produce an image corresponding to the transformation, the knowledge taught by the lesson is reinforced in the student's mind. The amount of assistance given in preparing the camera is dependent upon the students learning level. For younger students, precise instructions may be given to set the camera, or alternatively, the computer will set the camera electronically. Older students will be encouraged to derive the proper settings themselves.

While a stretching transformation is a fairly simple application of the camera 10 to the teaching of mathematics, more complex problems may also be addressed. For example, the camera 10 could be used to demonstrate the concept of Kepler's laws governing planatary motion. Kepler's laws describe the path of planets in an elliptical orbit with the sun at one focus. A line joining a planet to the sun sweeps out equal areas in equal times and the square of the period of any planet is proportional to the cube of the planet's mean distance from the sun. To investigate Kepler's laws, a student could utilize a computer-assisted instruction module and a computer-controlled topological perspective camera 10. The software will guide the students in building an elliptical track shape and calculating the equations that move the topological panorama camera 10 around the track 14 in accordance with Kepler's predictions. The camera will then be programmed to move at a constant rate around the elliptical configuration, providing a visual description of the motions and a comparison of how the space is recorded in the two photographs.

Another unique feature of the topological panorama camera is the unique opportunities for students to study relativistic mechanics. The film and camera motions of the topological panorama camera are synchronized and move relative to one another. This allows for an infinite variation of the film/camera speed relationships. The principles of time dilation, length contraction, simultaneity and clock synchronization can be examined using the camera.

For use in educational institutions, it may be desirable to equip the topological panorama camera 10 with an instant film development attachment, which could provide results to the students without delay. While an instant film development attachment is not commercially available, one could be designed using the processes used by cameras sold under the Poloroid mark. Alternatively, the image received through the optical slit could be digitized and stored in a computer using electronics similar to those in video cameras.

Many other mathematical and scientific principles may be taught using the topological panoramic camera 10. Tables I–III list a number of these principles. Table I provides a list of methods to manipulate the topological panorama camera 10 to derive concepts. Table II lists a number of concepts which are derived from exploration of the mechanical structure of the topological panorama camera 10 itself. Table III outlines a number of concepts which may be reinforced by use of the topological panorama camera 10 to demonstrate the principles.

Methods to Manipulate the Topological Panorama Camera to Derive Concepts

*Changes in the film/camera speed ratios
*Linear Track shape
*Other shapes (curves, arcs, ellipse, parabola, etc.)
*Film/camera speed varies during exposure (example—compensating for a curved track piece)
*Track set up as vertical arc
*Subject motion
*Changing the lens
*Film/camera movement in opposite directions

II. CONCEPTS DERIVED FROM THE DESIGN OF THE MACHINE

*Nodal point and center of mass
*Mechanical energy—work, kinetic energy, conservation of energy
*Characteristics of machines, mechanical advantage
*Electricity - characteristics, electrical forces, potential differences, electric currents, electrical circuits III. CONCEPTS DERIVED FROM INTERPRETING DATA FROM IMAGES AND FROM MANIPULATING THE TOPOLOGICAL PANORAMA CAMERA 10

*Perspective
*Plane of normal perspective definition of plane
*Golden ratio
*Similarity, ratio, proportion
*Distance formula
*Relection, transformation, and rotations
*Dilations
*Angular speed vs. linear speed
*Motion along an incline plane
*Harmonic motion
*Measure of angle
*Velocity, acceleration, and other rates of change
*Cartesian coordinate (mapping)
*Investigating lines in a plane
*Curve sketching
*Center of mass
*Arc lengths
*Moments about a point, moments about a line
*Investigation of parabolas, ellipses, hyperbolas, cycloids
*Plane curves and parametric equations
*Vectors in the plane, vectors in space
*Functions of one variable, functions of several variables
*Investigation of tangents and secants
*Average rate of change vs. instantaneous rate of change
*Curvature of a circle
*Direction of motion along a straight line
*Geography and Archeological Mapping
*Direction of motion along a curved line
*Work done by a constant force
*Work done by a variable force
*Finding a minimum area
*Reflective property of inverses
*Investigation of centrifugal force
*Distance between parallel lines
*Keplers law
*Vector valued functions
*Plot graphs
*Characteristics of motion
*Kinematics—speed, recti-linear velocity, circular motion
*Dynamics - forces, friction, gravity
*Wave reflection (mirrors)
*Relativistic mechanics—spacetime physics
*Graphical analysis of motion
*Newton's laws of motion
*Motion in two dimensions The present invention could also be implemented using robotic control to transport the camera 12 along a predetermined path. The robotic transport unit should be programmable such that the speed and direction of the unit can be defined by the user over set intervals. The robotic transport unit should also be responsive to external control signals which affect speed and direction.

Although the present invention has been described in detail, it should be understood that various changes, substitutions and alterations can be made herein without departing from the spirit and scope of the invention as defined by the appended claims.

What is claimed is:

1. Apparatus for recording an image of a subject comprising:
    transport apparatus operable to define a predetermined path which is wholly or partially non-rotational; and
    a camera connected to said transport apparatus comprising:
        a lens for receiving the image;
        a recording medium for recording the image; and
        an exposure plate having a slit formed therein for communicating a portion of the image to the recording medium.

2. The apparatus of claim 1 wherein said transport apparatus comprises:
    a track defining said predetermined path; and
    driving apparatus for moving said camera along the track.

3. The apparatus of claim 2 wherein said track comprises a plurality of track members which may be selectively connected together to define a desired path.

4. The apparatus of claim 3 where one or more of said track members comprises a curved member.

5. The apparatus of claim 2 wherein said track comprises first and second rails, said camera being disposed therebetween.

6. The apparatus of claim 5 wherein said first rail is disposed vertically above said second rail.

7. The apparatus of claim 5 wherein said first and second rails comprise inwardly pointing V-shaped portions, and wherein said transport apparatus comprises a plurality of wheels having grooves formed therein for matingly engaging said V-shaped portions.

8. The apparatus of claim 3 and further comprising connecting means associated with said track members to provide a smooth and sturdy connection between said connected track members.

9. The apparatus of claim 8 wherein said rails comprises hollow rails and wherein said connecting means comprises:
   a V-shaped connector portion for conforming to the insides of said hollow rails; and
   screw means for exerting pressure on said V-shaped connecting means against said hollow rails.

10. The apparatus of claim 2 wherein said driving apparatus comprises:
    a motor connected to said camera; and
    a plurality of wheels operably driven by said motor.

11. The apparatus of claim 10 wherein said track is operable to conduct electricity to said motor.

12. The apparatus of claim 2 and further comprising control circuitry connected to said transport apparatus for controlling the speed and direction of said camera.

13. The apparatus of claim 12 wherein said track is operable to conduct control signals to said control circuitry.

14. The apparatus of claim wherein said recording medium comprises a photographic film.

15. The apparatus of claim 1 wherein recording medium comprises a semiconductor imaging device.

16. The apparatus of claim 1 wherein said transport apparatus is operable to change speeds.

17. An apparatus for producing a panoramic image comprising:
    a track defining a desired path having a portion which is linear;
    camera having an optical slit for receiving a portion of the image, said camera further comprising a film transport for exposure; and
    a camera transport for moving said camera along said track.

18. The apparatus of claim 17 wherein said film transport comprises film direction control apparatus for selectively moving said film in either a first or second direction.

19. The apparatus of claim 18 wherein said film control apparatus further comprises film speed control apparatus for variably setting the speed at which the film moves relative to said optical slit.

20. The apparatus of claim 17 wherein said camera transport comprises camera speed control apparatus for moving said camera at a variable speeds along the track during exposure.

21. The apparatus of claim 17 wherein said camera transport comprises camera direction control apparatus for selectively moving said camera in a desired direction along the track.

22. The apparatus of claim 17 wherein said camera transport comprises a plurality of wheels connected to said camera and matingly engaged with said track.

23. The apparatus of claim 22 wherein said track comprises first and second rails, one or more of said wheels associated with said first rail pivotally connected to said camera.

24. The apparatus of claim 23 wherein said camera transport further comprises tensioning apparatus for maintaining said wheels in contact with said first rail.

25. The apparatus of claim 17 and further comprising control circuitry operably connected to said film transport for programmably controlling said film transport in a desired manner.

26. The apparatus of claim 17 and further comprising control circuitry operably connected to said camera transport for programmably controlling said camera transport in a desired manner.

27. A method for recording an image of a subject comprising the steps of:
    receiving the image through a lens;
    communicating the image through a slit;
    exposing a recording medium to the portion of the image received through the slit; and
    transporting the lens, slit and recording medium along a predetermined path which is wholly or partially non-rotational such that the entire image is communicated through the slit to recording medium.

28. The method of claim 27 wherein said transporting step comprises the step transporting said lens, slit, and recording medium along a track defining a predetermined path.

29. The method of claim 28 and further comprising the step of conducting electricity along said tracks.

30. The method of claim 28 and further comprising the step of moving the recording medium relative to said slit at a predetermined speed and direction.

31. The method of claim 30 and further comprising the step of variably controlling the speed and direction of said recording medium relative to said slit.

32. The method of claim 27 and further comprising the step of controlling the speed and direction at which the lens, recording medium and slit are transported along said predetermined path.

* * * * *

UNITED STATES PATENT AND TRADEMARK OFFICE
CERTIFICATE OF CORRECTION

PATENT NO. : 4,943,821
DATED : July 24, 1990
INVENTOR(S) : Janet L. Gelphman and Kurt R. Mottweiler It is certified that error appears in the above-identified patent and that said Letters Patent is hereby corrected as shown below:

IN THE CLAIMS

Claim 14, column 11, line 20, after "claim" insert --1--.

Claim 17, column 11, line 32, after "for" insert --moving photographic film relative to said optical slit during--.

Signed and Sealed this

Twenty-second Day of October, 1991

Attest:

HARRY F. MANBECK, JR.

*Attesting Officer*     *Commissioner of Patents and Trademarks*